United States Patent [19]

Cartner

[11] 4,048,789
[45] Sept. 20, 1977

[54] MOWER ATTACHMENT FOR TRACTORS

[76] Inventor: Jack O. Cartner, 1005 N. 8th St., Cambridge, Ohio 43725

[21] Appl. No.: 704,071

[22] Filed: July 9, 1976

[51] Int. Cl.² .......................................... A01D 35/26
[52] U.S. Cl. ...................................... 56/11.9; 56/16.2
[58] Field of Search ............................... 56/14.7–16.3, 56/10.5, 10.6, 11.9, 10.7

[56] References Cited
U.S. PATENT DOCUMENTS

| 2,976,663 | 3/1961 | Smith et al. | 56/10.7 |
| 3,221,482 | 12/1965 | Cowling | 56/15.8 |
| 3,274,762 | 9/1966 | Jolls | 56/15.2 |
| 3,729,910 | 5/1973 | Hardee | 56/11.9 |

Primary Examiner—Russell R. Kinsey
Attorney, Agent, or Firm—Cushman, Darby & Cushman

[57] ABSTRACT

A mower attachment for tractors having a hydraulically articulated linkage system for controlling horizontal, vertical and angular movement of the mower.

5 Claims, 2 Drawing Figures

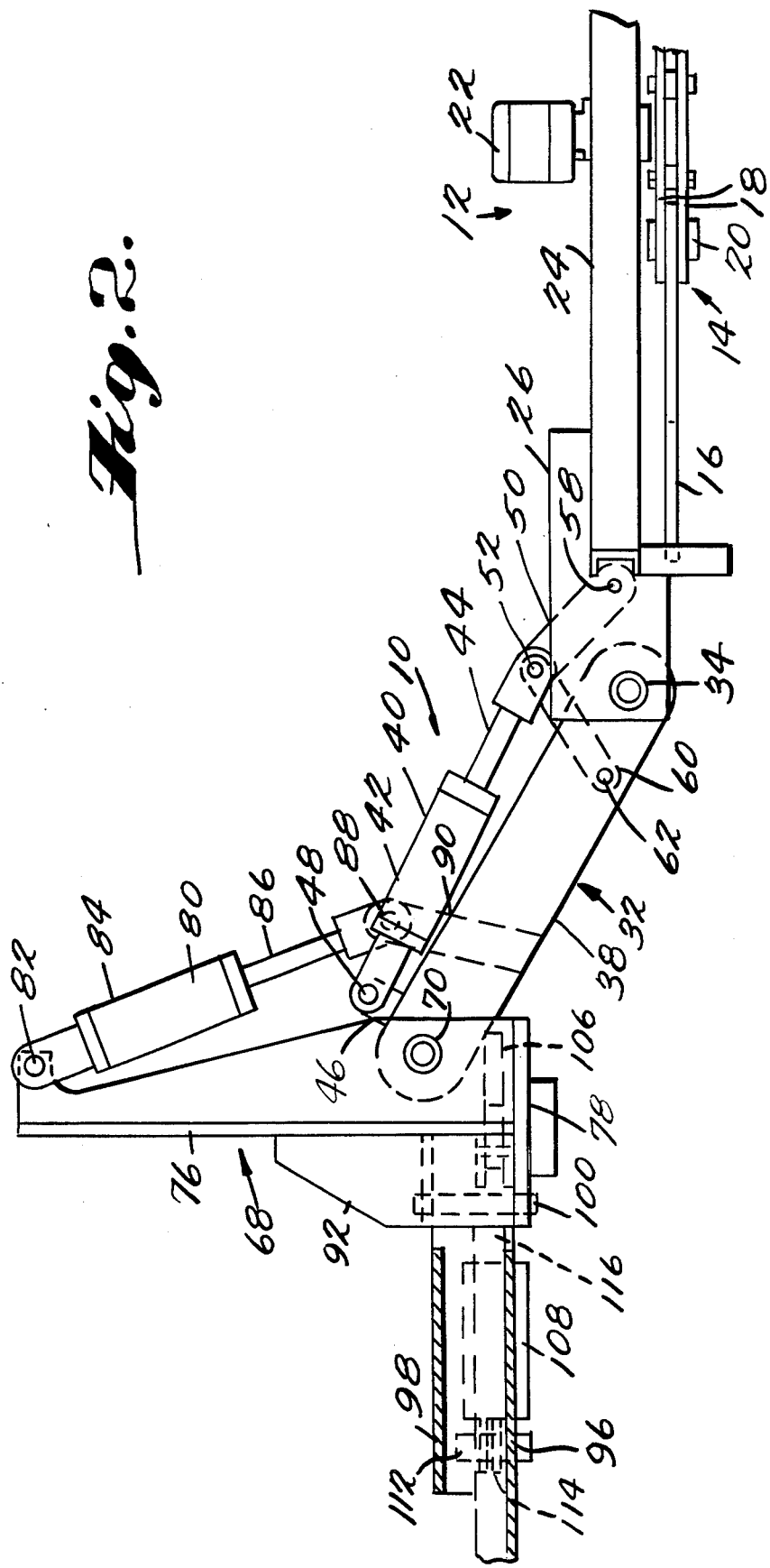

MOWER ATTACHMENT FOR TRACTORS

BACKGROUND OF THE INVENTION

1. Field of the Invention:

This invention relates to mower attachments for tractors and more particularly to the hydraulically articulated type.

2. Prior Art:

The prior art offers a variety of articulated attachment devices for attaching a mower, particularly the rotary type to which the present invention is directed, so that the desired vertical, horizontal and angular movements may be obtained for mowing varying terrain such as along roadways or on golf courses, and the like. Some of the advantages strived for by the prior art are strength and stability in the articulating linkage so that the mower will be stable and maintain its relative height from the ground and yet be relatively easily displaced, such as by lifting to avoid obstacles, requiring that the articulating linkage not be too heavy and cumbersome. To achieve this many of the prior art devices have become highly complicated and are thus subject to frequent breadkdowns and need for repairs and replacement of parts.

SUMMARY OF THE INVENTION

The present invention obtains the above described advantages strived for by the prior art as well as eliminates many of the disadvantages referred to above, by providing an articulated linkage which is hydraulically operated and has few moving parts which are relatively strong, thus, providing the desired stability while permitting ease of articulation to move the mower into the desired position.

More particularly, the present invention provides a novel mower and attachment means for attaching the mower to the tractor which more basically comprises a conventional rotary mower with a housing encompassing the rotational path of the blade and which is attached to the tractor or the like with the following linkage:

a first bracket is rigidly secured to the mower housing and a main support member is attached for relative pivotal rotation about a horizontal axis at one end thereof to the first bracket;

a first hydraulic cylinder means is secured for pivotal rotation about a horizontal axis at one end thereof to an end of the main support member opposite the one end of the main support member to which the first bracket is attached;

a second bracket is secured for relative pivotal rotation about a horizontal axis at one end thereof to the first bracket above the pivotal axis between the main support member and the first bracket, and the second bracket is secured for relative pivotal rotation about a horizontal axis at an end opposite the one end thereof which is secured to the first bracket, to an end of the first hydraulic cylinder means opposite the one end of the first hydraulic cylinder means which is secured to the main support member, so that action of the first hydraulic cylinder means will cause relative pivotal movement between the first and second bracket means;

a third bracket secured for relative pivotal rotation about a horizontal axis at one end thereof to the one end of the main support member which is secured to the first bracket, at a position inwardly from the pivotal axis between the main support member and the first bracket, and the third bracket is secured for relative pivotal rotation about a horizontal axis at an end opposite the one end thereof secured to the main support member, to the opposite end of the first hydraulic cylinder means and further has the same pivotal axis as the second bracket and the first hydraulic cylinder means, so that action of the first hydraulic cylinder means causes relative pivotal movement between the first and third brackets such that contraction of the first hydraulic cylinder means causes upward pivotal movement of the mower;

a vertical support member, to a lower end of which the main support member is secured for relative pivotal rotation about a horizontal axis at an end of the main support member opposite the one end thereof which is secured to the first bracket;

a second hydraulic cylinder means secured for relative pivotal rotation about a horizontal axis at one end thereof to an upper end of the vertical support member and secured for relative pivotal rotation about a horizontal axis at an opposite end thereof to the main support member between the pivotal axes of the main support member to the vertical support member and the first bracket means, so that action of the second hydraulic cylinder means causes relative pivotal movement between the main support member and the vertical support member such that contraction of the second hydraulic cylinder means causes upward pivotal movement of the main support member;

a horizontal attachment bracket to which the vertical support member is secured on the lower end thereof for relative pivotal rotation about a vertical axis;

a third hydraulic cylinder means secured for pivotal rotation about a vertical axis at one end thereof to the horizontal attachment bracket remote from the connection of the vertical support member to the horizontal attachment bracket, an opposite end of the third hydraulic cylinder means being secured for pivotal rotation about a vertical axis to the lower end of the vertical support member, so that action of the third hydraulic cylinder means causes relative pivotal movement of the vertical support member and the horizontal attachment bracket such that contraction of the third hydraulic cylinder means causes pivotal movements of the housing means in a horizontal plane; and means for rigidly securing the attachment bracket to a tractor.

BRIEF DESCRIPTION OF THE DRAWINGS

FIG. 2 is a side elevational view of the preferred embodiment of the present invention.

DETAILED DESCRIPTION OF THE PREFERRED EMBODIMENT

Figure 1:
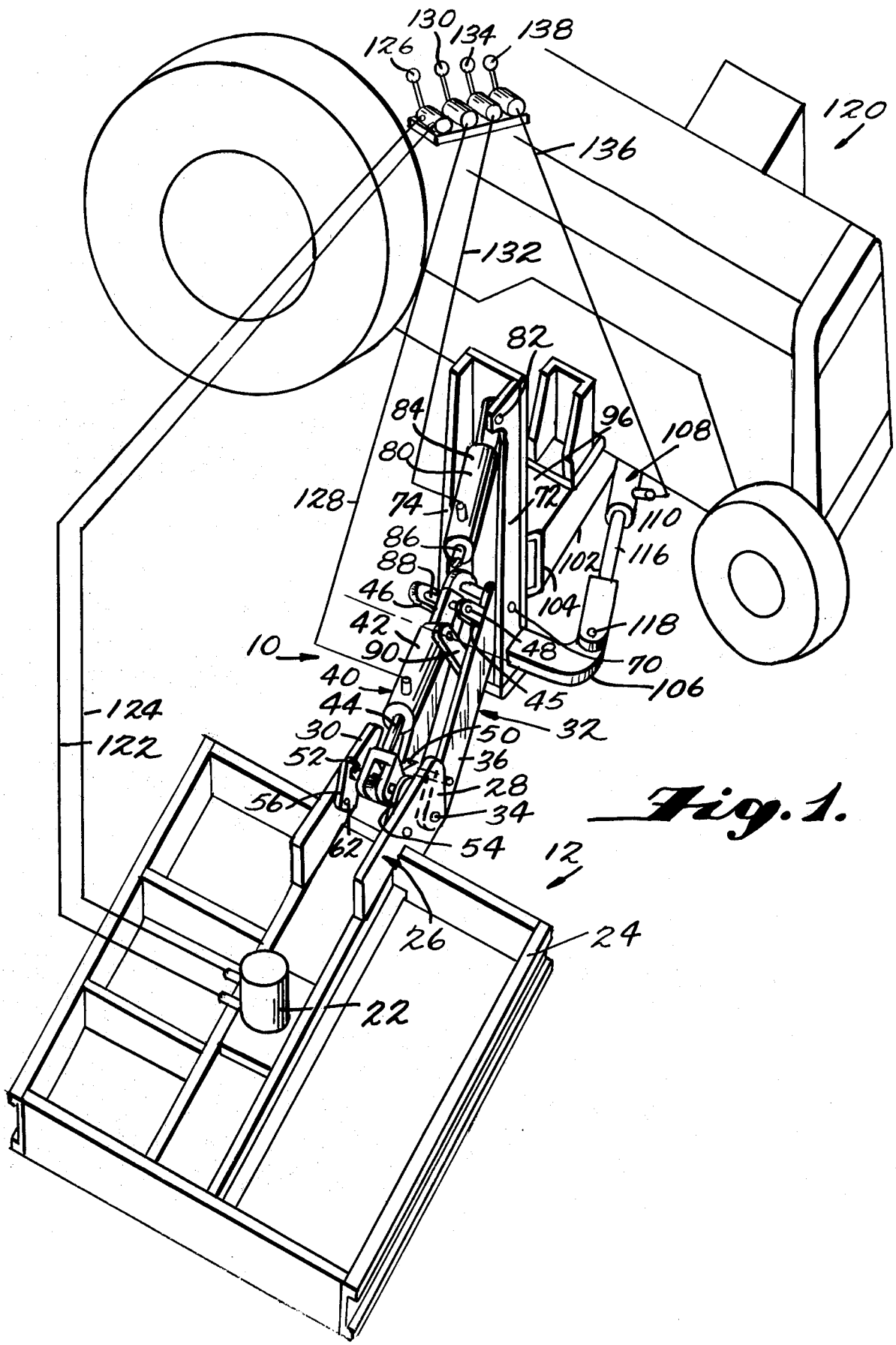
FIG. 1 is a pictorial illustration of the preferred embodiment of the present invention secured to a tractor.

The mower attachment of the present invention, generally designated 10, is best illustrated in FIG. 2. The mower portion 12 comprises a rotary blade 14 which is of conventional construction and contains a plurality of blades 16 which are secured between a pair of plates 18 and pivotal about bolts 20 so that if they strike a hard object, such as a stone, they will pivot out of the way rather than be broken or deformed due to the impact. Plates 18 are in turn secured for rotation to a shaft rotated by a hydraulic motor means 22 of conventional construction. A housing 24 is provided which encompasses the rotational path of the blades 16.

Secured to one end of the housing 24 is a first bracket 26, which is best seen in FIG. 1, and is actually a pair of spaced plates 28 and 30 which are secured to the top of the housing 24 by welding or the like.

At the ends of plates 28 and 30 opposite the ends which are secured to housing 24, a main support member 32 is attached for relative pivotal rotation about a horizontal axis by means of a pin 34 which extends through corresponding holes in bracket 26 and main support member 32. The main support member 32 is preferably composed of a steel member having a rectangular cross section with vertical side portions 36 and 38. The side portions 36 and 38 are positioned between plates 28 and 30 with the pin 34 extending through the plates and side portions to hold them together for relative pivotal movement. The pin 34 can be of the type having an enlarged head on one end and a hole for a cotter key on the other so that the pin may be easily inserted and removed.

A first hydraulic cylinder means 40 is secured for relative pivotal rotation about a horizontal axis at one end thereof to an end of the main support member 32 opposite to the end of the main support member at which it is secured to bracket 26 by pin 34. The first hydraulic cylinder means 40 preferably comprises a double acting hydraulic cylinder means of conventional design having a cylinder 42 and piston connected to piston rod 44. The hydraulic cylinder 42 is pivotally secured by means of pin 48 to projections 45 and 46 welded to main support member 32.

Secured for relative pivotal rotation about a horizontal axis to the end of piston rod 44 is a second bracket 50 which pivots about pin 52. Again, like bracket member 26, bracket 50 is preferably composed of two plates 54 and 56 which are maintained in parallel spaced relation on opposite sides of the end portion of piston rod 44. At the other end of bracket 50 opposite pin 52, plates 54 and 56 are secured for relative pivotal rotation to the first bracket member 26 by means of pin 58 which permits bracket 50 to rotate relative to the first bracket member 26.

Also secured to piston rod 44 by pin 52 for relative pivotal rotation about a horizontal axis, is a third bracket member 60. The end of bracket 60 opposite the pin 52 is likewise pivotally secured by pin 62 to the main support member 32. The bracket 60 preferably comprises a single plate 64 which is maintained centered between plates 54 and 56 on pin 52. It is to be noted that the third bracket 60 is secured to the main support member 32 as shown in FIG. 2 at a position inwardly from the pivotal axis between the main support member and the first bracket 26. Also, it is to be noted that the position of pin 58 on the first bracket 26 should be such that the anticipated normal moving of the mower portion 12 by the linkage composed of the first bracket member 26, the second bracket member 50, the third bracket member 60 and the main support member 32 should be such that an over dead center position does not occur with the position of pin 58 relative to pins 34 and 62. In other words, the position of pins 58 and 62 should be such that under normal operating conditions the pin 58 would never go below a plane passing through the longitudinal axis of pins 34 and 62, otherwise, the mechanical advantage provided by the linkage mechanism is lost. The linkage mechanism should be designed so that it does not "lock up", i.e. lose its mechanical advantage at any point during the normal movement of the mower portion 12. One practical embodiment of this design permits a total vertical arcuate movement of mower portion 12 relative to the mower of 155 degrees with a 90 degree upward movement from horizontal and a 65 degree movement downward.

A vertical support member 68 is provided to which an end of the main support member 32 is secured for relative pivotal rotation by pin 70. The vertical support member is preferably composed of a pair of parallel spaced plates 72 and 74 secured to a backing member 76 and a base plate 78 such as by welding or the like. Pin 70 is the same as pin 34 and a spacer member (not shown) can be provided on pin 70 to maintain the plates 72 and 74 in spaced relation.

At an upper end of the vertical support member 68 a second hydraulic cylinder means 80 is secured at one end thereof for relative pivotal rotation about pin 82. The hydraulic cylinder means 80 is a double acting hydraulic cylinder similar to hydraulic cylinder means 40, which has a hydraulic cylinder 84 with a piston coupled to a hydraulic piston rod 86. The hydraulic cylinder 84 is pivotally connected by pin 82 to the plate 72 of vertical support member 68 and the piston rod 86 is pivotally secured by pin 88 to an extension 90 of main support member 32 welded to side portion 36 thereof. As best illustrated in FIG. 1, extension 90 extends only from side portion 36 and not from side portion 38 and the pin 82 only secures the end of hydraulic cylinder 84 to plate 72 by pin 82. Thus, the second hydraulic cylinder means 80 is offset from the plane of the first hydraulic cylinder means 40.

To the back of the vertical support member 68 is rigidly secured a web member 92 for providing additional strength to the support member. A cross plate 94 is also secured to the back of the vertical support member 68 in spaced parallel relation from the base plate 78. A pair of spaced horizontal support plates 96 and 98 are pivotally secured by pin 100 to the cross plate 94 and base plate 78 of the vertical support member 68. The support plates 96 and 98 form upper and lower walls of a rectangular cross section main support member 102 a side wall 104 of which is shown in FIG. 1. The main support member 102 is provided with means (not shown) for securing the mower attachment to a tractor remote from the end which is secured to the vertical support member 68.

A fourth bracket member 106 is fixedly secured in a horizontal position to the lower side of the vertical support member 68, as seen in FIG. 1. A third hydraulic cylinder means 108 is a double acting hydraulic cylinder means, having its hydraulic cylinder 110 pivotally secured by pin 112 to an extension 114 welded to the side of the support member 102, and its piston rod 116 pivotally secured by pin 118 to the fourth bracket member 106. Hydraulic cylinder means 108, however, is different from hydraulic cylinder means 40 and 80 in that it includes a mechanism whereby it will automatically permit the mower portion 12 to swing horizontally forward or rearward on a predetermined impact force. The mechanism which provides this advantage is the subject of U.S. Pat. No. 3,949,539, incorporated herein by reference, and will thus not be discussed in detail.

Once the attachment means 10 is secured to a tractor 120 as illustrated in FIG. 1, a plurality of hydraulic lines are secured to the attachment means 10 to each of the hydraulically operated cylinder means so that manual control can be performed by the operator of the tractor.

A first pair of hydraulic lines 122 and 124 operate the hydraulic mower motor 22 and are controlled by first control valve 126. A third hydraulic line 128 operates the first hydraulic cylinder means 40 and is controlled by a second control valve 130. A fourth hydraulic line 132 operates the second hydraulic cylinder means 80 and is controlled by a third control valve 134. A fifth hydraulic line 136 controls the third hydraulic cylinder means 108 and is controlled by a fourth control valve 138. All of the control valves 126, 130, 134 and 138 as well as all of the hydraulic lines 122, 124, 128, 132 and 136, are supplied with hydraulic fluid from hydraulic pump (not shown) which is preferably operated off the main drive motor of the tractor.

In operation, the mower portion 12 may be pivotally rotated about pin 34 by movement of the first hydraulic cylinder means 40 such that contraction of the hydraulic cylinder means 40 will cause an upward pivotal movement of the mower 12 about the pin 34. Contraction of the second hydraulic cylinder means 80 will cease the main support arm 32 to be pivotally raised and rotated about pin 70 thus causing further upward angular movement of the mower portion 12. Contraction of the hydraulic cylinder means 108 will cause movement of the mower portion 12 in a horizontal plane towards the front of the tractor and extension will of course cause movement of the mower portion to the rear of the tractor.

Although the foregoing description illustrates the preferred embodiment of the present invention, it will be apparent to those skilled in the art that variations are possible. All such variations as would be obvious to those skilled in this art are intended to be included within the scope of this invention as defined by the following claims.

What is claimed is:

1. A mower and attachment means for attaching the mower to a tractor, comprising:
    rotary blade means;
    motor means for rotating the blade means;
    housing means for encompassing the rotational path of the blade means;
    first bracket means rigidly secured to the housing means;
    a main support member attached for relative pivotal rotation about a horizontal axis at one end thereof to the first bracket means;
    first hydraulic cylinder means secured for relative pivotal rotation about a horizontal axis at one end thereof to an end of the main support member opposite the one end of the main support member;
    second bracket means secured for relative pivotal rotation about a horizontal axis at one end thereof to the first bracket means about the pivotal axis between the main support member and the first bracket means, and said second bracket means being secured for relative pivotal rotation about a horizontal axis at an end opposite the one end thereof to an end of the first hydraulic cylinder means opposite the one end of the first hydraulic cylinder means so that action of the first hydraulic cylinder means will cause relative pivotal movement between the first and second bracket means;
    third bracket means secured for relative pivotal rotation about a horizontal axis at one end thereof to the one end of the main support member at a position inwardly from the pivotal axis between the main support member and the first bracket means, and said third bracket means being secured for relative pivotal rotation about a horizontal axis at an end opposite the one end thereof to the opposite end of the first hydraulic cylinder means and having the same pivotal axis as the second bracket means and the first hydraulic cylinder means so that action of the first hydraulic cylinder means causes relative pivotal movement between the first and third bracket means such that contraction of the first hydraulic cylinder means causes upward pivotal movement of the housing means;
    a vertical support member, to a lower end of which the main support member is secured for relative pivotal rotation about a horizontal axis at an end of the main support member opposite the one end thereof;
    second hydraulic cylinder means secured for relative pivotal rotation about a horizontal axis at one end thereof to an upper end of the vertical support member and secured for relative pivotal rotation about a horizontal axis at an opposite end thereof to the main support member between the pivotal axes of the main support member to the vertical support member and the first bracket means so that action of the second hydraulic cylinder means causes relative pivotal movement between the main support member and the vertical support member such that contraction of the second hydraulic cylinder means causes upward pivotal movement of the main support member;
    a horizontal attachment bracket to which the vertical support member is secured on the lower end thereof for relative pivotal rotation about a vertical axis;
    third hydraulic cylinder means secured for pivotal rotation about a vertical axis at one end thereof to the horizontal attachment bracket remote from the connection of the vertical support member to the horizontal attachment bracket, an opposite end of the third hydraulic cylinder means being secured for pivotal rotation about a vertical axis to the lower end of the vertical support member so that action of the third hydraulic cylinder means causes relative pivotal movement of the vertical support member and the horizontal attachment bracket such that contraction of the third hydraulic cylinder means causes pivotal movement of the housing means in a horizontal plane; and
    means for rigidly securing the horizontal attachment bracket to a tractor.

2. A mower as defined in claim 1 wherein the first, second and third hydraulic cylinder means are reciprocating double acting hydraulic cylinders and pistons.

3. A mower as defined in claim 1 and further including remote control means for independently actuating each hydraulic cylinder means.

4. A mower as defined in claim 1 secured to a tractor.

5. A mower as defined in claim 2 wherein the third hydraulic cylinder means further includes means for permitting the horizontal attachment bracket to swing in a horizontal plane away from the direction of travel of the housing means upon impact on the housing means by an object with a predetermined force, whereby injury to the housing means and rotary blade means will be prevented.

* * * * *